United States Patent Office 3,573,985
Patented Apr. 6, 1971

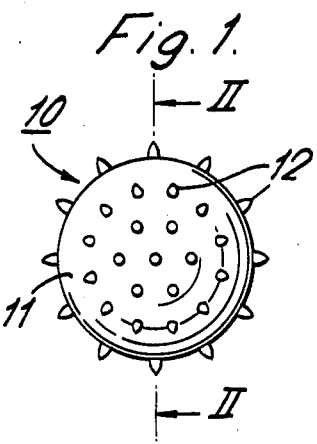
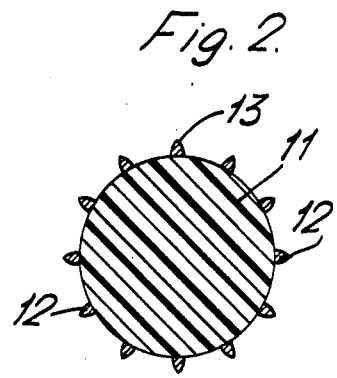
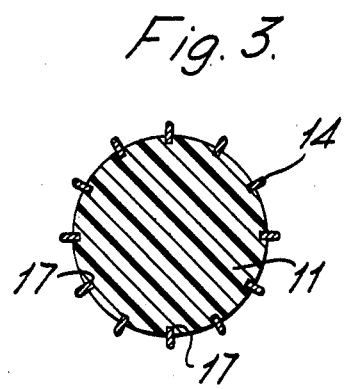
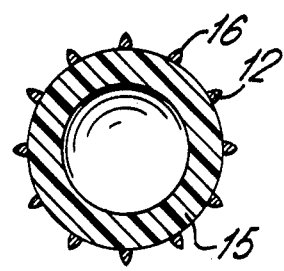
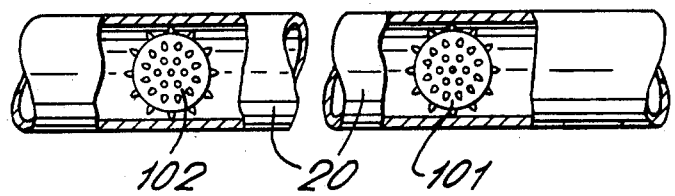

3,573,985
METHOD FOR CLEANING PIPELINES
Ronald W. Schultz, Lodgepole, Alberta, Canada, assignor to Western Decalta Petroleum Limited, Calgary, Alberta, Canada
Filed Aug. 12, 1968, Ser. No. 751,844
Claims priority, application Canada, Aug. 15, 1967, 997,884
Int. Cl. B08b 9/04
U.S. Cl. 134—8    10 Claims

ABSTRACT OF THE DISCLOSURE

Procedure for cleaning pipelines which includes forcing a plurality of pipeline cleaning "pig" balls through the pipeline. Pipeline cleaning kit comprising a first lead "pig" ball and a second follower "pig" ball. The "pig" balls have a generally spherical main body formed of a resiliently deformable material which is provided with a plurality of discrete, discontinuous and laterally spaced apart protuberances upstanding from the surface thereof. In each case the protuberances have a hardness greater than that of the main body. In addition, the second or follower "pig" ball has a main body formed of a resiliently deformable material having a hardness greater than the hardness of the main body of the first or leading "pig" ball. The "pig" balls preferably are formed of natural or synthetic rubber, with the protuberances having a tip formed of a hard metallic substance such as tungsten carbide.

---

This invention relates to cleaners for pipelines. It relates particularly to a novel "go-devil" or "pig" for the cleaning of pipelines, and to a novel method of cleaning pipelines.

In many industries pipelines are used for conveying fluids under pressure from one place to another, and in all cases it is desirable that the flow of fluid should be free and unimpaired, both in regard to volume and also to velocity, and the relationship of these two factors to each other should be fairly constant.

When in use, these pipelines to a greater or less degree become fouled or partially clogged by a build-up of scale, thereby reducing the effective area of the pipeline, and increasing the frictional resistance to the flow of fluid or liquid through the pipeline.

It thus becomes necessary periodically to clean the pipeline. Among some of the methods used for cleaning such pipelines are the use of acids or other chemicals, sand blasting (if the pipe can be disconnected) or "pigs." If such cleaning involves the shutting down of the pipeline, and/or the disconnecting of any parts of the pipeline, then the efficiency of the line becomes greatly impaired due to the loss of the work hours during which the line is out of commission.

The character of the fluid being conveyed through the pipeline may influence the speed and frequency of the fouling of the pipeline, and a heavy and more viscous fluid may tend to foul a pipeline quicker than a light fluid, but whatever be the characteristics of the fluids, it will be appreciated that unless the pipeline is maintained in proper serviceable condition, then monetary loss of operation of the line becomes high.

As is now well known, the pipeline transportation industry extensively uses travelling plugs, such as spherical members or "pig balls," in the pipelines for the purpose of effecting such defouling. One field of general use is in the flow line through which crude oil produced by an oil well is transferred to the tank battery. In certain areas this line becomes coated on the inside with a layer of wax which is deposited by the oil. This layer becomes thicker as the oil continues to flow and sometimes plugs the flow line completely. By inserting a ball, sometimes referred to as a "pig," in the line at the wellhead, the oil pressure will force it through the flow line scraping out the wax ahead of it. The pipeline is often comprised of a plurality of diameter sizes, and it is desirable to inject a sphere or plug at intervals along the pipeline in accordance with the diameter variances therein. Furthermore, since the pipeline may be formed of a plurality of welded-together sections, a slight decrease in internal diameter of the pipeline occurs as a result of the welding bead. Fouling and/or build-up tends to occurs at such locations. In the use of these balls which pass through the line along with the fluid travelling in the line, the industry has now provided many kinds of apparatus to launch or inject the spheres into the line and many means to remove the spheres from the lines at predetermined points. As now used in the art, the term "ball pig" has come to refer to a spherical body of solid or inflatable material, e.g. rubbery material, which cleans out pipelines. The ball pig is forced through the pipeline, cleaning as it travels. Generally, the ball pig has a diameter slightly larger than the internal diameter of the pipeline and acts as a free plunger as it is driven by fluid (liquid or air) pressure through the length of the pipeline.

Pig balls, as now known in the art, may be inflatable, flexible and hollow spheres, or they may be rigid plastic compositions or flexible, solid spheres. It may be made of a rubbery material such as polychloroprene, commercially available as neoprene. It may be solid or inflatable and may be slightly larger in diameter than the inside diameter of the pipeline to be "pigged."

"Pigging" the pipeline is a term used to describe an operation where a "pig" is inserted into a pipeline for separation of products or when the pipeline is to be completely emptied of fluid or coating debris from the inner walls of a pipeline, e.g. 3", 4", 6" or larger in diameter. The ball effectively squeegees the pipe walls as it passes through the pipeline. A uniform fluid pressure on one side of the ball moves it forward against inertia and resistance when the ball is properly started on its way into the pipeline.

It is, therefore, an object of this invention to provide a novel method for the cleaning of pipelines. An object of another aspect of this invention is the provision of a novel kit for the cleaning of pipelines.

By one aspect of this invention there is provided a method for the cleaning of pipelines. This method includes the steps of (a) placing, in the pipeline to be cleaned, a first lead "pig" ball having a generally spherical main body formed of a resiliently deformable material and provided with a plurality of discrete, discontinuous and laterally spaced apart protuberances upstanding from the surface thereof, said protuberances having a hardness greater than that of the main body; (b) forcing said first lead "pig" ball a distance along said pipeline; (c) placing in said pipeline a second follower "pig" ball having a generally spherical main body formed of a resiliently deformable material having a hardness greater than the hardness of the main body of said first lead "pig" ball and provided with a plurality of discrete, discontinuous and laterally spaced apart protuberances upstanding from the surface thereof, said protuberances having a hardness greater than that of the main body of said follower "pig" ball; and (d) forcing said travelling "pig" balls through said pipeline.

By another aspect of this invention is provided a kit for the cleaning of pipelines. The kit comprises the combination of (a) a first lead pipeline cleaning travelling "pig" ball having a generally spherical main body formed of a resiliently deformable material and provided with a plurality of discrete, discontinuous and spaced apart protuberances upstanding from the surface thereof, said protuberances having a hardness greater than that of said main body, and (b) a second follower pipeline cleaning travelling "pig" ball having a generally spherical main body formed of a resiliently deformable material and provided with a plurality of discrete, discontinuous and laterally spaced apart protuberances upstanding from the surface thereof, said protuberances having a hardness greater than that of said main body, and said main body having a hardness greater than the hardness of the main body of said lead "pig" ball.

In the drawings which accompany this specification:

FIG. 1 is a front elevation view of a "pig" ball suitable for use according to this invention.

FIG. 2 is a cross-section view taken along the line II—II of FIG. 1.

FIG. 3 is a cross-section view similar to that of FIG. 2 but showing an alternative structure of "pig" ball according to the practice of this invention.

FIG. 4 is a cross-section view similar to that of FIGS. 2 and 3 showing another alternative embodiment of the "pig" ball useful in the practice of this invention.

FIG. 5 is a schematic representation of the practice of the method aspect of the present invention.

It is essential that the "pigs" be resiliently deformable but the precise material out of which the pig" is formed may be selected from a wide variety. The "pig" may be formed of a solid or a hollow plastic or natural rubber or synthetic rubber which is of sufficient resiliency as to be able to be forced through a pipeline and to be resiliently deformed by permanent obstructions in the pipeline but be substantially undeformed by temporary obstructions, e.g. scale build-up within the pipeline. Thus, depending on the particular use to which the "pigs" may be put, and the type of scale within the pipeline, the resiliently deformable material may be a "soft" rubber, e.g. have a Shore A Durometer hardness of 30–50; a "semi-hard" rubber, e.g. have a Shore A Durometer hardness of 50–100; or a "hard" rubber, e.g. have a Shore A Durometer hardness above 100. Among the rubbers which may be used which would be selected to have the appropriate hardness may be mentioned: natural rubber; butadiene-styrene copolymers (e.g. Buna S); butadiene-acrylonitrile copolymers (e.g. Perbunan, Hycar, Chemigum); polychloroprenes (e.g. neoprene); isobutylene diolefin coploymers (e.g. butyl); polysulfide rubbers (e.g. Thiokols, Perdurens); and polybutene rubbers (e.g. Vistanex, polybutene). In addition some vinyl resins are also useful, (e.g. Koroseal, Flamenol, Igelite, Mipolom, Vinylite V).

Turning now to FIGS. 1–4, it is seen that the "pig" balls 10 are provided with a plurality of circumferentially spaced protuberances which are harder than the main ball. The protuberances 12 are for the purpose of enhancing the cleaning action by knocking, cutting or scraping away sedimentary or other deposits from the inside of the pipeline. While the protuberances 12 must be harder than the main ball, they need not be formed of a different material. Thus the protuberances 12 may be formed of the same material (chemically) but having the necessary degree of hardness. The protuberances 12, if formed of the resiliently deformable material 11, may be provided with hard metal tips 13 (as shown in FIG. 2). Alternatively, the protuberances may be formed of hard metal 16 suitably secured to the circumferential surface of the main ball which, as shown in FIG. 4, is a hollow resiliently deformable ball 15. They may be in the form of lugs to knock inside sedimentary deposits from the pipeline. They may be sharpened to function as scrapers or cutters (not shown) to clean the pipeline of such deposits. One particularly prepared type of protuberance is tungsten carbide studs 14 (see FIG. 3). These are generally embedded in holes 17 drilled in the resiliently deformable ball 11.

There is no criticality in the disposition of the protuberances on the surface of the ball. Thus, they may be more or less equidistantly spaced, or they may be fairly densely arrayed and offset to have an irregular pattern. Generally, having a protuberance at every ½ square inch of the surface is very satisfactory. The protuberances are generally ¼ to ⅜ inch high (i.e. they extend outwardly by that amount from the surface).

In one embodiment of this invention, pipeline cleaning means and a pipeline cleaning method are provided in which the lead or first "pig" is formed of a relatively soft or highly elastic rubber (to clean the bulk of the scale build-up from the inside walls of the pipeline) and the second or follower "pig" is formed of a harder or less elastic rubber (to effect a thorough finishing of the cleaning of the inside of the pipeline). The invention, of course, embraces the use of more than two "pigs" and the use of the same "pigs" as leader and follower.

FIG. 5 shows a pipeline 20 being cleaned by the process according to one aspect of this invention. The pipeline 20 is provided with the usual control valves (not shown) and with a conventional means well known to those skilled in the art for injecting "pig" balls into the pipeline 20 and for removing the "pig" balls after they have traversed the portion of the pipeline to be cleaned. In carrying out the process according to one aspect of this invention, a pig ball 101 is injected into the pipeline 20 by conventional means, and is propelled along the pipeline by the fluid pressure therewithin. After a predetermined interval of time, a second pig ball 102 is similarly injected into the pipeline and both pig balls 101 and 102 are propelled along the pipeline 20 by fluid pressure, the pig balls remaining in spaced apart relation. If desired, additional pig balls (not shown) may be injected into the pipeline 20. As each pig ball traverses the portion of the pipeline 20 to be cleaned, it is removed by conventional means and the loosened sediment and other fouling material is also withdrawn.

In one example, a pipeline, ¾ mile long having a nominal internal diameter of 3 inches, was cleaned according to one aspect of this invention. The first or lead "pig" was a solid ball formed of neoprene and was provided with a plurality of tungsten carbide protuberances spaced at ½ inch centres. It had a Shore A Durometer hardness of 50 and an external diameter 3 inches. The second or follower "pig" was a solid ball formed of Hycar. It, too, was provided with a plurality of tungsten carbide protuberances spaced at ½ inch centres, but it had a Shore A Durometer hardness of 50 and an external diameter of 3 inches. An applied force of 50 p.s.i. was required to propel the "pigs" through the pipeline to clean the line.

For a pipeline 2 miles long, using the same "pigs," a force of 80 p.s.i. was required. This compares very favourably with the sand blast technique, where, for a pipeline 2 miles long, a force of 800–1200 p.s.i. created by a 2 H.P. motor is needed.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A method for cleaning pipelines which comprises:
    (a) placing, in the pipeline to be cleaned, a first lead "pig" ball having a generally spherical main body formed of a resiliently deformable material and provided with a plurality of discrete, discontinuous and laterally spaced apart protuberances upstanding from the surface thereof, said protuberances having a hardness greater than that of the main body;
    (b) forcing said first lead "pig" ball a distance along said pipeline;
    (c) placing in said pipeline a second follower "pig" ball having a generally spherical main body formed of a resiliently deformable material having a hardness greater than the hardness of the main body of said first lead "pig" ball and provided with a plurality of discrete, discontinuous and laterally spaced apart protuberances upstanding from the surface thereof, said protuberances having a hardness greater than that of the main body of said follower "pig" ball; and (d) forcing said travelling "pig" balls through said pipeline.

2. The method as defined in claim 1 wherein the resiliently deformable main body of said first lead "pig" ball is formed of a natural or synthetic rubber having a Shore A Durometer hardness between 30 and 50, and the resiliently deformable main body of said second follower "pig" ball is a natural or synthetic rubber having a Shore A Durometer hardness greater than 100.

3. The method as defined in claim 1 wherein the resiliently deformable main body of said first lead "pig" ball is formed of a natural or synthetic rubber having a Shore A Durometer hardness between 50 and 100, and the resiliently deformable main body of said second follower "pig" ball is a natural or synthetic rubber having a Shore A Durometer hardness greater htan 100.

4. The method as defined in claim 1 wherein steps (a), (b), (c) and (d) are repeated more than once.

5. The method as defined in claim 1 wherein a pressure between 50 and 80 p.s.i. is used to force the "pig" balls through the pipeline.

6. A method as defined in claim 1 wherein the protuberances on said travelling "pig" balls are formed of metal.

7. A method as defined in claim 6 wherein said protuberances have tips formed of tungsten carbide.

8. The method as defined in claim 1 wherein the resiliently deformable main body of said first lead "pig" ball is formed of a natural or synthetic rubber having a Shore A Durometer hardness between 30 and 50, and the resiliently deformable main body of said second follower "pig" ball is a natural or synthetic rubber having a Shore A Durometer hardness between 50 and 100.

9. The method as defined in claim 8 wherein steps (a), (b), (c) and (d) are repeated more than once.

10. The method as defined in claim 8 wherein a pressure between 50 and 80 p.s.i. is used to force the "pig" balls through the pipeline.

References Cited

UNITED STATES PATENTS

| | | | |
|---|---|---|---|
| 2,258,174 | 10/1941 | Chawner | 15—104.06 |
| 2,478,961 | 8/1949 | Wortham | 15—104.06 |
| 2,668,307 | 2/1954 | Preen | 15—104.06 |
| 2,705,419 | 4/1955 | Chawner | 15—104.06X |
| 2,745,231 | 5/1956 | Prince | 15—104.06X |
| 3,011,197 | 12/1961 | Nehse et al. | 15—104.06 |
| 3,090,058 | 5/1963 | Ver Nooy | 15—104.06 |
| 3,204,274 | 9/1965 | Knapp | 15—104.06 |

MORRIS O. WOLK, Primary Examiner

J. T. ZATARGA, Assistant Examiner

U.S. Cl. X.R.

15—104.06